(12) United States Patent
Sentoku

(10) Patent No.: US 7,019,515 B2
(45) Date of Patent: Mar. 28, 2006

(54) PULSAR RING, MAGNETIZING DEVICE AND MAGNETIZING METHOD FOR PULSAR RING-USE MAGNETIZED MEMBER, AND BEARING UNIT HAVING PULSAR RING

(75) Inventor: Minoru Sentoku, Kashiba (JP)

(73) Assignee: Koyo Seiko Co., Ltd., Osaka (JP)

( * ) Notice: Subject to any disclaimer, the term of this patent is extended or adjusted under 35 U.S.C. 154(b) by 204 days.

(21) Appl. No.: 10/237,698

(22) Filed: Sep. 10, 2002

(65) Prior Publication Data

US 2003/0048164 A1 Mar. 13, 2003

(30) Foreign Application Priority Data

| Sep. 11, 2001 | (JP) | ........................................ | 2001-274485 |
| Mar. 13, 2002 | (JP) | ........................................ | 2002-067912 |
| Apr. 22, 2002 | (JP) | ........................................ | 2002-118666 |

(51) Int. Cl.
*G01B 7/30* (2006.01)

(52) U.S. Cl. ............. 324/207.25; 324/174; 324/207.11; 335/302

(58) Field of Classification Search ......... 335/302–306; 324/207.11, 207.25, 174
See application file for complete search history.

(56) References Cited

U.S. PATENT DOCUMENTS

| 4,002,937 A | 1/1977 | Anson | .......................... 310/168 |
| 4,470,031 A | 9/1984 | Steingroever et al. |
| 4,746,862 A | 5/1988 | Ueki et al. |
| 4,924,161 A | 5/1990 | Ueki et al. |
| 5,896,301 A | 4/1999 | Croix et al. |
| 6,717,401 B1 * | 4/2004 | Schwabe | ................ 324/207.22 |

FOREIGN PATENT DOCUMENTS

| DE | 31 40 302 | 4/1983 |
| DE | 39 34 691 | 4/1991 |
| DE | 197 58 037 | 7/1998 |
| DE | 198 00 774 | 7/1999 |
| DE | 199 36 536 | 2/2001 |
| FR | 2 590 989 | 6/1987 |
| GB | 1 591 418 | 6/1981 |
| WO | WO 93/23859 | 11/1993 |

* cited by examiner

*Primary Examiner*—Ramon M. Barrera
(74) *Attorney, Agent, or Firm*—Oblon, Spivak, McClelland, Maier & Neustadt, P.C.

(57) ABSTRACT

A pulsar ring is provided with a ring-shaped supporting member and a magnetized member formed into a strip shape and secured to a circumferential face of the supporting member so that N-poles and S-poles are arranged alternately with equal pitches. The length of the circumferential face of the supporting member is set so as to correspond to the length of the magnetized member so that the end portions of the magnetized member are butted to each other without any gap with the magnetic property in the butted portion being maintained to have equal pitches. The magnetized member is magnetized by a magnetizing device, and then affixed to the supporting member.

7 Claims, 9 Drawing Sheets

PULSAR RING, MAGNETIZING DEVICE AND MAGNETIZING METHOD FOR PULSAR RING-USE MAGNETIZED MEMBER, AND BEARING UNIT HAVING PULSAR RING

BACKGROUND OF THE INVENTION

1. Field of the Invention

The present invention relates to a pulsar ring which serves as a detected part of a rotation speed sensor used for ABS or the like of cars, a magnetizing device and a magnetizing method used for applying a magnetized member having a number of magnetic poles alternately formed thereon to the pulsar ring, and a bearing unit having a bearing on which the pulsar ring and the sensor are installed.

2. Description of the Related Art

In railway vehicles and cars, a antifriction bearing unit with a sensor, which has a antifriction bearing, a sensor device attached thereto and a pulsar ring serving as a detected part, has been used for supporting a vehicle shaft or a rotary shaft for transmitting rotations to the vehicle shaft and for detecting the rotation speed of the shaft.

Pulsar rings are classified into those of a gear type that are manufactured by machining or the like, and those of a magnetic type that are manufactured by using molds, and the dimension and shape thereof are determined depending on the dimension and shape of a antifriction bearing to which the pulsar ring is attached.

The pulsar ring of the magnetic type is formed by bonding a rubber magnetic material (formed by dispersing magnetic material powder in rubber) to a circumferential surface of a ring-shaped supporting member that has been manufactured so as to be applied to the bearing, and by magnetizing the rubber magnetic material by using a magnetizing-use mold that has been manufactured in accordance with the dimensions of the supporting member and the rubber magnetic material.

In the conventional magnetic pulsar ring, it is necessary to manufacture a new magnetizing-use mold each time the bearing is modified, resulting in high costs.

Examples of the magnetizing device for the pulsar ring-use magnetized member include a multipolar magnetizing device which simultaneously magnetizes a number of magnetic poles and a single-polar magnetizing device which magnetizes pole by pole while shifting the member to be magnetized. In the conventional multipolar magnetizing device, a magnetizing process is carried out on one surface of a member to be magnetized with the member to be magnetized being supported on a supporting member; consequently, although this process has an advantage in that the magnetizing process is carried out at one time, the resulting magnetic force is weak, causing a difficulty in sensing the change in its magnetic characteristic by using a magnetic sensor. In order to solve this problem, the size of a current used for magnetizing is increased, and the sensitivity of the magnetic sensor is increased; however, the former has a problem of high costs required for magnetizing, and the latter has a problem of an expensive magnetic sensor.

Moreover, in the conventional bearing unit with a sensor in which the above-mentioned pulsar ring is provided on a bearing together with a sensor device, magnetic poles are formed with equal pitches so as to continuously provide an uniform output in the pulsar ring, with the result that it is not possible to find an origin signal serving as a reference for one rotation. Therefore, in order to detect an absolute angle based upon the origin, an origin detecting sensor and an origin detecting ring (or a detected point) are required, resulting in a complex mechanical structure and a new space in which these parts are assembled.

SUMMARY OF THE INVENTION

One object of the present invention is to provide a pulsar ring which eliminates the necessity of manufacturing a new magnetizing-use mold even when the dimension or shape of a bearing or the like to which the pulsar ring is attached is changed.

Another object of the present invention is to provide a magnetizing device and a magnetizing method for a pulsar ring-use magnetized member capable of carrying out an entire pole magnetizing process and providing a greater magnetic force upon obtaining the pulsar ring.

Still another object of the present invention is to provide a bearing unit having the pulsar ring, the bearing unit capable of obtaining an origin signal without the necessity of newly installing an origin detecting sensor and an origin detecting ring.

In the pulsar ring according to the present invention, a magnetized member, which is separately formed, is secured to a ring-shaped supporting member so that N-poles and S-poles are alternately arranged thereon.

In the pulsar ring according to the present invention, the magnetized member is formed so that, in any of the cases before the securing process and after the securing process, N-poles and S-poles are continuously formed alternately with equal pitches (hereinafter, referred to as a first embodiment of a pulsar ring according to the present invention), and the magnetized member is constituted by a plurality of plate-shaped magnets, and the plate-shaped magnets are secured to a supporting member so that magnetic poles on the surface side are arranged with N-poles and S-poles being alternately placed with equal pitches (hereinafter, referred to as a second embodiment of a pulsar ring according to the present invention).

In the first embodiment of the pulsar ring according to the present invention, the magnetized member is made of a material having flexibility such as a rubber elastic material. The magnetized member may be obtained by cutting a sheet-shaped rubber magnetic material into strips. In this case, the magnetizing process may be applied to the sheet-shaped magnetic material or may be applied to the material that has been cut into strips. The magnetized member formed into a strip is cut to have a length which corresponds to the circumferential length of the support member, and then affixed to virtually the entire circumference of the support member. The magnetized member may also be obtained by cutting a disk-shaped rubber magnetic material into a ring shape. In this case, the magnetizing process may be applied to the disc-shaped rubber magnetic material, or may be applied to the material that has been cut into a ring shape. Ring-shaped magnetized member s having different diameters are obtained from the disc-shaped magnetized member, and the respective magnetized member s thus obtained are affixed to virtually the entire circumference of the support member having a circumferential length corresponding to the diameter.

In accordance with the first embodiment of the pulsar ring according to the present invention, when the dimension of a support member is changed, the magnetized member, which has been formed as a continuous material, is cut to a dimension corresponding to the dimension of the supporting member so that it is possible to manufacture a new pulsar ring without the necessity of forming a new magnetizing-use mold.

In the first embodiment of the pulsar ring according to the present invention, the magnetized member may be easily attached not only to the circumferential face of the supporting member, but also to the side face thereof. Therefore, with respect to the structure of the pulsar ring of the first embodiment, it may be constituted by a supporting member having a cylinder shape and a magnetized member (prior to the securing process, strip-shaped magnetized member) secured to the outer circumference or inner circumference of a cylinder, or it may be constituted by a supporting member constituted by a cylinder portion and an inward or outward flange portion provided on one end thereof, and a magnetized member (prior to the securing process, a ring-shaped magnetized member) which is fixed to the side face of the flange portion of the supporting member.

Moreover, the length of the circumferential face of the supporting member may be set to correspond to the length of the magnetized member so that the ends of the magnetized member s can be butted to each other without any gap with the magnetic property at the butted portion being allowed to have equal pitches.

In order to provide such an arrangement, for example, the magnetized member having a continuous shape is cut so that the length of the respective magnetic poles at the end portion becomes the same as the length of the magnetic poles in the other portion, with one end being set to N-pole and the other end being set to S-pole, and the supporting member is designed so that no gap is formed between the end portions when this magnetized member having a continuous shape is affixed. Moreover, the magnetized member may have the same pole in both of the end portions, and in this case, the magnetized member having a continuous shape is preferably cut so that the length of the joined magnetic poles on both of the ends becomes the same as the length of magnetic poles of other portions. For example, in the case when the supporting member has a cylinder shape with a magnetized member being secured to the outer circumferential face, and is fitted to the inner ring of a bearing so as to cover it, the inner diameter of the supporting member is determined depending on the outer diameter of the inner ring, and the outer diameter of the supporting member is finely adjusted so that the end portions of the magnetized member are properly butted to each other.

With this arrangement, even though there is a butted portion, it is possible to form magnetic poles with N-poles and S-poles being alternately arranged with equal pitches on the circumferential face of the supporting member.

In contrast, an arrangement may be made so that equal pitches are not given in the magnetic property in the vicinity of the butted portions of the magnetized member.

In order to provide this arrangement, the magnetized member having a continuous shape is affixed to the supporting member so as to have a gap between the end portions. Moreover, while the length of the joined magnetic poles on both of the ends is set to be different from the length of magnetic poles of other portions, the magnetized member having a continuous shape may be affixed to the supporting member so as not to have any gap between the end portions.

With this arrangement, it is possible to obtain a discontinuous signal at only one portion per one rotation; therefore, this position can be positively utilized as a reference position or the like for one rotation. In this case, since it is not necessary to match the length of the circumferential face of the supporting member to the length of the magnetized member, the dimensional limitation to the supporting member is eliminated so that, even when the specification of the bearing is changed, it is possible to manufacture the corresponding pulsar ring easily at low costs.

The end portion of the magnetized member may of course be cut with a face orthogonal to the length direction, or the end face may be formed as a face other than the face orthogonal to the length direction. In order to provide an end face other than the face orthogonal to the length direction, for example, one end portion may be formed to have a convex shape, and the other end portion may be formed to have a concave shape; alternatively, both of the end portions may be cut diagonally, or may be cut into a waveform or a saw-teeth form.

Upon allowing the end portions of the magnetized member to be butted each other without any gap and to maintain equal pitches in the magnetic property in the vicinity of the butted portions, the end portions of the magnetized member are preferably set to have an end face other than the face orthogonal to the length direction. With this arrangement, even when any error occurs in the manufacturing process, it is possible to prevent an extreme magnetic property change at the butted portions, and consequently to reduce noise caused by the discontinuous portions.

In accordance with the second embodiment of the pulsar ring according to the present invention, when the dimension of the supporting member is changed, the number of magnets and/or the gap in which the magnets are affixed may be changed in accordance with the dimension of the supporting member so that it becomes possible to manufacture a new pulsar ring without the necessity of newly manufacturing magnetizing-use mold.

In accordance with the second embodiment of the pulsar ring according to the present invention, the magnetized member can be easily provided not only on the circumferential face of the supporting member, but also on the side face thereof. Therefore, the pulsar ring of the second embodiment may be constituted by a cylinder shaped supporting member and a magnetized member (a plurality of magnets) secured to the outer circumference or inner circumference of the cylinder member, or it may be constituted by a cylinder unit, a supporting member made of an inward or outward flange portion that is attached thereto and a magnetized member (a plurality of magnets) secured to the side face of the flange portion of the supporting member. In any of the cases, concave portions in which magnets are placed may be formed on the face of the supporting member to which the magnets are secured. With this arrangement, it is possible to easily carry out a positioning process upon affixing the magnets, and consequently to easily carry out the affixing process.

The magnetizing device for a pulsar ring-use magnetized member according to the present invention is provided with a first magnetizing unit having a first magnetic pole array in which N-poles and S-poles are alternately arranged and a second magnetizing unit having a second magnetic pole array which faces the first magnetizing unit with a gap for a member to be magnetized layout, and has S-poles and N-poles that are arranged in a manner reversed to the first magnetic pole array, and in this arrangement, a magnetizing process can be carried out with the member to be magnetized being sandwiched by the first magnetizing unit and the second magnetizing unit from both of the sides.

In accordance with the magnetizing device for a pulsar ring-use magnetized member according to the present invention, the first and second magnetizing units are aligned face to face with each other, with the member to be magnetized being interpolated in between, and the N-pole of the first member is set to face the S-pole of the second member, with the S-pole of the first member being set to face the N-pole of the second member; therefore, in comparison with a magnetizing process from one side, it is possible to greatly increase a magnetizing force, and to provide a magnetized member having a greater magnetic force. Therefore, it becomes possible to improve the sensing precision, and to make the device less susceptible to influences from noise. Consequently, it becomes possible to use an inexpensive sensor by reducing the sensor sensitivity.

The magnetic pole array of the first and second magnetizing units may be formed into a ring shape so as to be suitable for a magnetizing process of a member to be magnetized having a ring shape, or may be formed into a strip shape (straight line shape) so as to be suitable for a magnetizing process of a magnetizing-subject material having a continuous shape. Moreover, this maybe formed into a disc shape so as to be suitable for a magnetizing process of a magnetizing-subject material having a disc shape; thus, in these cases, magnetized member s of a plurality of kinds can be formed by dividing the resulting disc-shaped magnetized member into concentric circles.

In order to obtain the above-mentioned magnetizing device, for example, each of the magnetizing units is constituted by a yoke unit having coil element housing sections placed with predetermined gaps, and a coil which successively passes through the respective coil element housing sections of the yoke unit. With respect to the formation of the coil element housing sections, concave and convex sections are formed on the opposing face to the member to be magnetized of the yoke unit so that the concave portions are allowed to serve as the coil element housing sections. In this case, the convex portions serves as the magnetizing units. The coil element housing units may be formed not as concave portions, but as through holes. The coil is formed by winding a wire on the yoke unit in a winding manner; thus, when a dc current is allowed to flow, N-poles and S-poles are formed in the coil with predetermined pitches. Each of the coils of the magnetizing units may be formed by a wire; however, after a wire has been wound on the first magnetizing unit from one end to the other end in a winding manner, the coil is wound from the other end of the first magnetized member to one end of the second magnetizing unit facing this end so that the wire is wound toward the end of the second magnetizing unit which faces the one end of the first magnetizing unit in a winding manner; thus, both of the magnetizing unit-use coils can be formed by one wire.

The magnetizing method of the pulsar ring-use magnetized member according to the present invention is provided with a first magnetizing unit having a first magnetic pole array having N-poles and S-poles alternately arranged and a second magnetizing unit having a second magnetic pole array that faces the first magnetizing unit with a member to be magnetized layout-use gap with S-poles and N-poles arranged in a manner opposite to the first magnetic pole array; and the member to be magnetized is sandwiched by the first and second magnetic pole arrays from both of the sides to be magnetized.

In accordance with the magnetizing method of the pulsar ring-use magnetized member according to the present invention, the member to be magnetized is sandwiched by the first and second magnetizing units to be magnetized so that, in comparison with a case in which it is magnetized from one side, the magnetizing force is greatly increased, making it possible to provide a magnetized member having a greater magnetic force. Therefore, it becomes possible to improve the sensing precision, and to make the device less susceptible to influences from noise. Consequently, it becomes possible to use an inexpensive sensor by reducing the sensor sensitivity.

For example, the magnetizing method of the present invention is applied to a case where the magnetic pole array of the respective magnetizing units is linearly aligned with the member to be magnetized having a strip shape.

Moreover, in the bearing unit according to the present invention in which a pulsar ring having N-poles and S-poles alternately arranged so as to output a rotation signal and a sensor device having a magnetic sensor placed to face the pulsar ring and a signal processing unit for carrying out signal processing based upon an output from the magnetic sensor are rotated relatively, the pulsar ring is constituted by a ring-shaped supporting member and at least one continuous magnetized member which is affixed to this along the circumferential direction thereof, with the end portion magnetic poles of the magnetized member that face each other having the same pole, with a gap being formed at the butted portion of the magnetized member , so that a detection-subject portion for a reference position signal, which provides an out put signal having a small bottom value at a peak portion, is formed at one place on the circumference of the pulsar ring, and the signal processing unit of a sensor device is provided with a reference position signal detection unit for detecting the detection-subject portion for a reference position signal of the pulsar ring.

In accordance with the bearing unit of the present invention, the pulsar ring is commonly used as an origin detecting ring, and the magnetic sensor of the sensor device is commonly used as an origin detecting sensor; therefore, it is possible to eliminate the necessity of assembling an origin detecting ring separately from the pulsar ring for outputting a rotation signal as well as the necessity of assembling an origin detecting sensor separately from the magnetic sensor for detecting the rotation signal; therefore, it becomes possible to simplify the structure of the bearing unit used for finding the rotation signal and the origin signal.

With respect to the width of the opposing end portion magnetic poles of the magnetized member and the gap formed at the butted portion of the magnetized member, these are appropriately set so that the peak value of the output signal from the detected part used for a reference position signal detection is set to substantially the same as the output signal from another portion and so that the small bottom value of the peak portion of the output signal does not become too small.

The areas of the mutually opposing end portion magnetic poles of the magnetized member are preferably set to substantially the same size, and each of the end portions of the magnetized member may have a face orthogonal to the length direction, or a face other than the face orthogonal to the length direction.

The signal processing unit of the above-mentioned bearing unit has, for example, a first threshold value which is smaller than the small bottom value of the output signal from the detected part for a reference position signal detection and a second threshold value which is greater than the small bottom value of the output signal from the detected part for a reference position signal detection and also smaller than the output peak of the detected part for a reference position signal detection, and when the input signal exceeds the first threshold value, a rotation signal is outputted while, when the input signal, after having become smaller than the second threshold value, again exceeds the second threshold value before reaching the first threshold value, the reference position signal is outputted.

More specifically, the signal processing unit, which finds both of the rotation signal and reference position signal, is provided with a first comparator which has a first threshold value that is smaller than the small bottom value of the output signal from the detected part for a reference position signal detection, and outputs an ON signal as an A signal when the input signal is not less than this threshold value, a second comparator which has a second threshold value that is greater than the small bottom value of the output signal from the detected part for a reference position signal detection, and is also smaller than the output peak of the detected part for a reference position signal detection, and outputs an ON signal as a B signal when the input signal is not less than this threshold value, a flip-flop which outputs an ON signal when the input signal exceeds the first threshold value, and also outputs an OFF signal as a C signal when it goes below the second threshold value, a first exclusive logical OR circuit which outputs an exclusive OR signal of the B signal and C signal as a D signal, and a second exclusive logical OR circuit which outputs an exclusive OR signal of the C signal and D signal as an E signal, and the A signal is used as a rotation signal and the E signal is used as an origin output signal.

Here, in this specification, the small bottom value, the output peak and the threshold value of the output signal are referred to as values in the case where the output voltage is positive, and in the case where the output voltage is negative, those are referred to as absolute values.

DESCRIPTION OF THE PREFERRED EMBODIMENTS

Hereinafter, embodiments of the present invention will be described with reference to the drawings.

Figure 1:
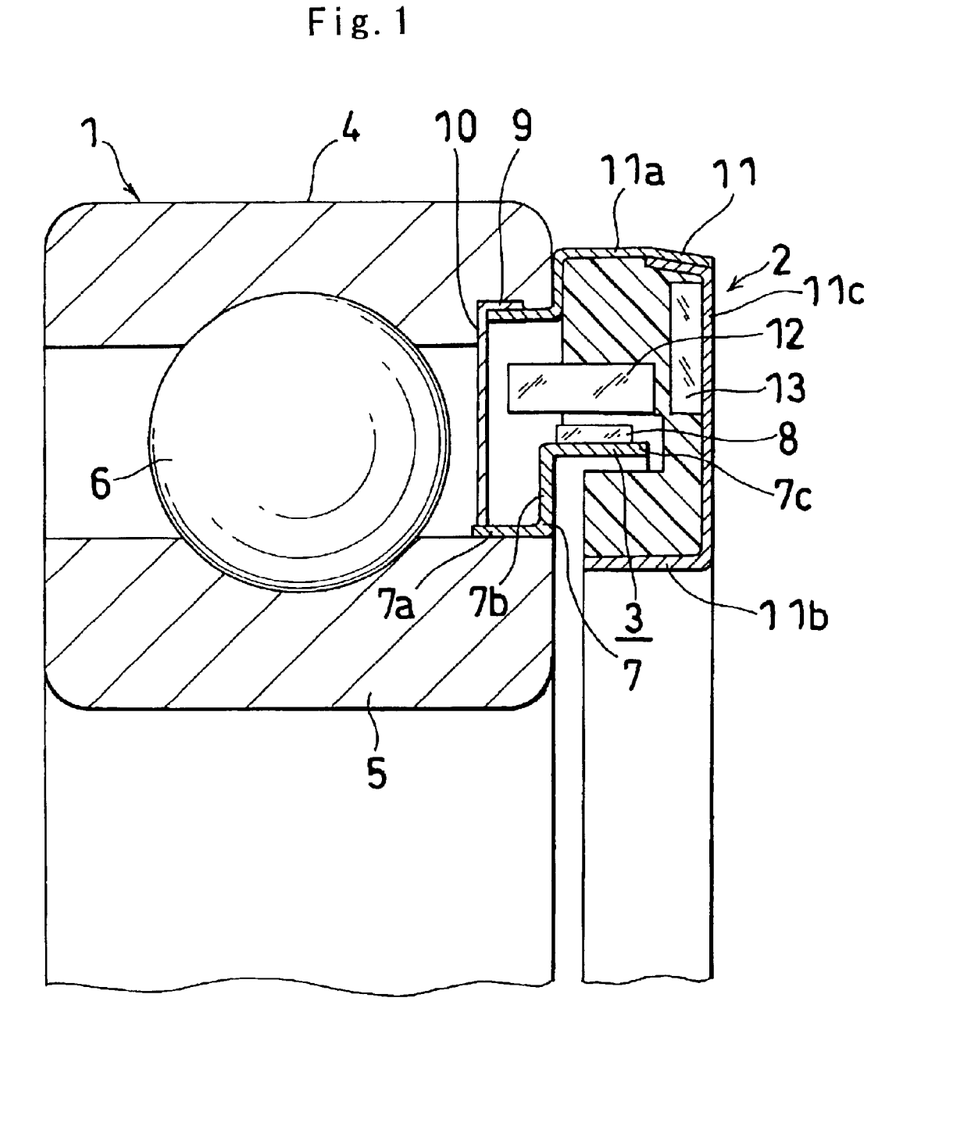
FIG. 1 is a cross-sectional view showing one embodiment of a antifriction bearing unit with a sensor to which a pulsar ring according to the present invention is applied.
Figure 2:
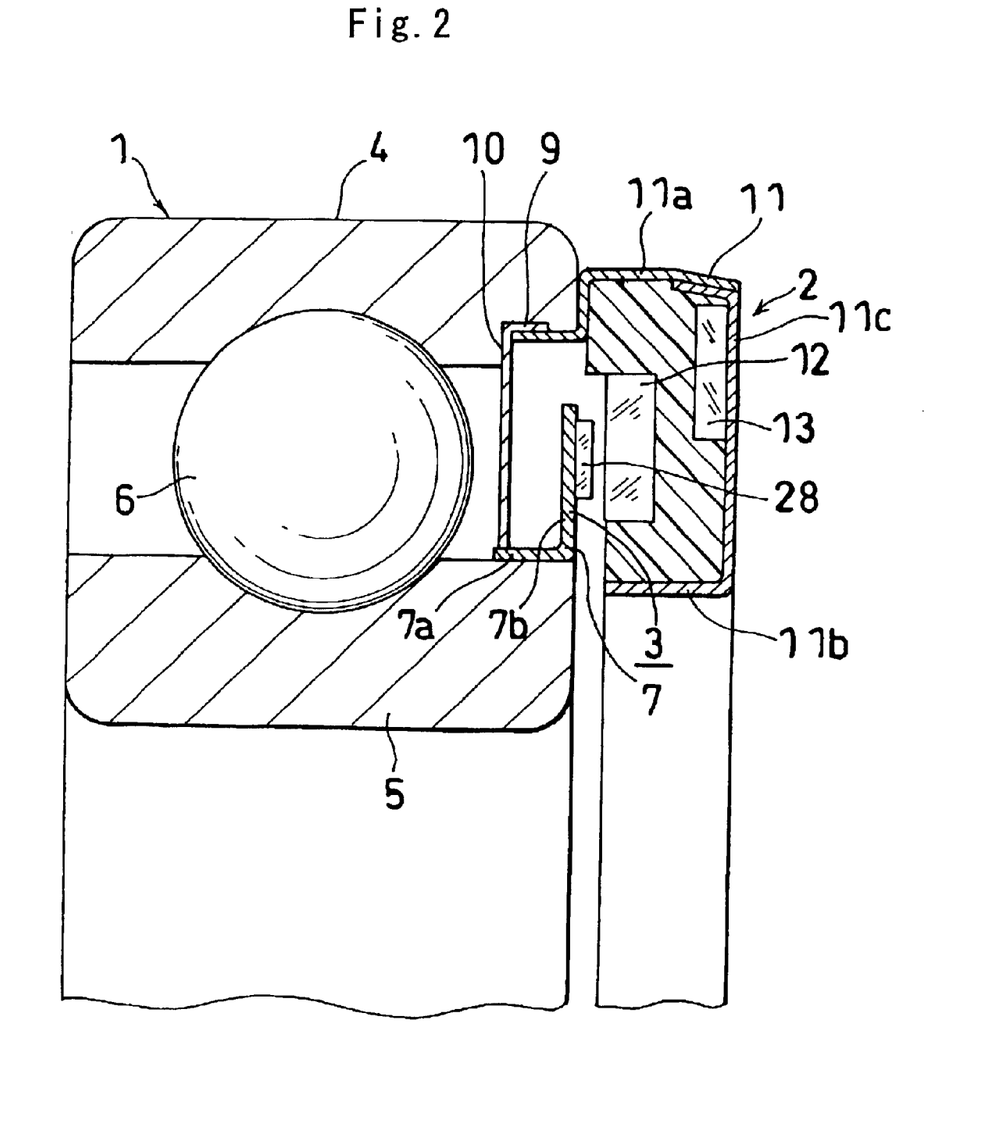
FIG. 2 is a cross-sectional view showing another embodiment of a antifriction bearing unit with a sensor to which the pulsar ring according to the present invention is applied.

FIGS. 1 and 2 show an upper half portion of an antifriction bearing unit with a sensor which is one example to which a pulsar ring of the present invention is applied. In description of FIGS. 1 and 2, "right" and "left" are referred to as "right" and "left" sides of the drawings.

As shown in FIG. 1, the antifriction bearing unit with a sensor is provided with a antifriction bearing (1), a sensor device (2) attached thereto and a pulsar ring (3) serving as a detected part.

The antifriction bearing (1) is provided with an outer ring (4) which is a fixed ring, an inner ring (5) which is a rotary ring and balls (6) which are a plurality of rotating members placed therebetween. Although not shown in the figures, the outer ring (4) is secured to a housing and the like, and a rotation shaft and the like are secured to the inner ring (5).

The pulsar ring (3) is constituted by a supporting member (7) secured to the inner ring (5) and a magnetized member (8) secured to the supporting member (7). The supporting member (7) is constituted by a small-diameter cylinder unit (7a) that is fitted to the outer circumference of the inner ring (5) so as to cover it, a round plate portion (flange portion) (7b) with a hole that extends outward from the right end of the small-diameter cylinder unit (7a) in the diameter direction, and a large-diameter cylinder unit (7c) that extends rightward from the outer circumferential edge of the round plate portion (7b), and formed into a ring shape as a whole.

A ring-shaped sealing groove (9) is formed in the shoulder portion of the inner diameter on the right end portion of the external ring (4). The outer circumferential edge of a contact seal (10) is fitted to this sealing groove (9) so that the inner circumferential edge of the seal (10) is made in contact with the left edge portion of the small-diameter cylinder unit (7a) of the supporting member (7) of the pulsar ring (3).

The sensor device (2) is provided with a case (11) secured to the outer ring (4), a sensor (12) installed in the case (11) and a sensor control unit (13).

The case (11) is constituted by an outer circumferential wall (11a) and an inner circumferential wall (11b) of a short cylinder, and a side wall (11c) having a disc shape with a hole that connects the right edge portions of these so that it forms a ring shape as a whole with its void portion having a virtually U-letter shaped cross-section. A free end (left end) of the outer circumferential wall (11a) extends leftward from the inner circumferential wall (11b), and this free end of the outer circumferential wall (11a) is closely fitted to the shoulder portion on the right end of the outer ring (4) so that the free end of the inner circumferential wall (11b) is placed close to the right end face that is closer to the inner diameter of the inner ring (5).

Moreover, FIG. 2 shows another embodiment of a antifriction bearing unit with a sensor to which the pulsar ring of the present invention is applied, and this embodiment is different from that of FIG. 1 in that the supporting member (7) is constituted by a cylinder unit (7a) fitted to the outer circumference of the inner ring (5) and an outward flange portion (7b) that is attached to the right end of the cylinder unit (7a), in which the magnetized member (28) is placed on the outer face of this flange portion (7b), and in that the sensor device (2) is allowed to face the pulsar ring (3) from outside in the axis direction.

Figure 3A:
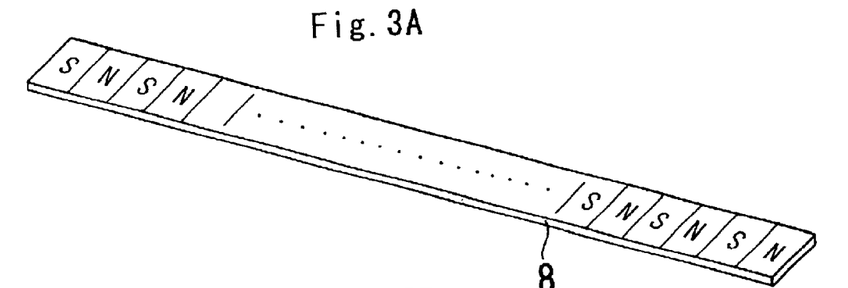
FIGS. 3A and 3B are perspective views showing a first embodiment of the pulsar ring according to the present invention.
Figure 3B:
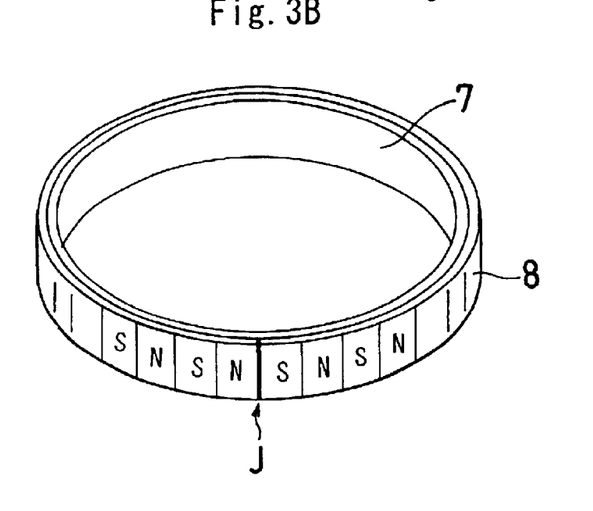

As shown in FIGS. 3A and 3B, in the first embodiment of the pulsar ring of the present invention, the magnetized member (8) is formed in a strip shape so that, with respect to the magnetic poles on the surface side, N-poles and S-poles are placed alternately with equal pitches, and the magnetized member (8) is affixed to the entire face of the outer circumferential face of the supporting member (7) with its end portions butted to each other. Here, in the case when one end of the magnetized member (8) is the N-pole, the other end is set to the S-pole so that the end portions of the magnetized member (8) are butted to each other in a manner so as to make the magnetic property of the butted portion (J) of the magnetized member (8) the same as that of the other portions. In order to make the magnetic property of the butted portion (J) of the magnetized member (8) the same as that of the other portions, the length of the magnetized member (8) is determined in association with the approximate dimension of the supporting member (7) so as to contain a plurality of sets of N-poles and S-poles, and the circumferential length of the magnetized member adhering face of the supporting member (7) is finely adjusted so as to match the length of the magnetized member (8).

In the first embodiment of the pulsar ring according to the present invention, the outer diameter of the supporting member (7) may be designed so as not to be finely adjusted in accordance with the pitch of the magnetized member (8), and may be designed to make the magnetic property at the butted portion (J) of the magnetized member (8) different from the other portions. In other words, in the case when at the butted portion (J), one end of the magnetized member is the N-pole with the other end being the S-pole, the end portions may be butted to each other so as to have a gap between the end portions, so that the area of the N-pole or the S-pole at the butted portion (J) may be different from the other portions.

Prior to the affixing process, the polarities of the end portions of the magnetized member (8) need not be made different from each other, and as shown in FIGS. 4A to 4D, the end portions whose area is cut to approximately one-half of the previous area may be butted to each other. In FIGS. 4A to 4D, those on the upper side show shapes in the vicinity of the butted portion (J), and those on the lower side show magnetic properties in the vicinity of the butted portion (J) qualitatively.

Figure 4A:
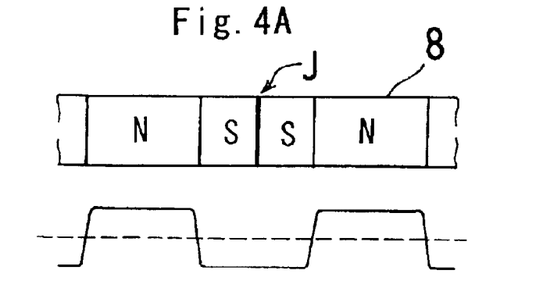
FIGS. 4A to 4D are views showing a modified embodiment of a butted portion of the first embodiment of the pulsar ring according to the present invention.
Figure 4B:
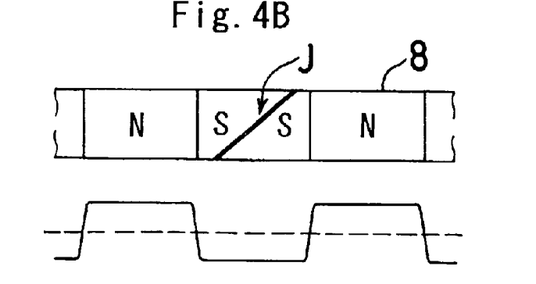
Figure 4C:
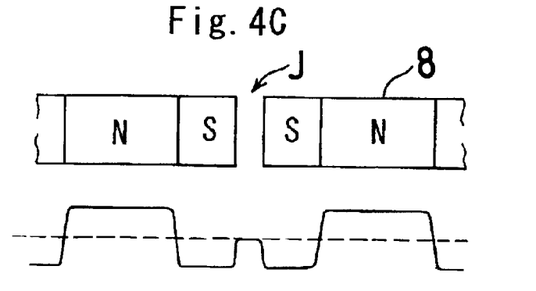
Figure 4D:
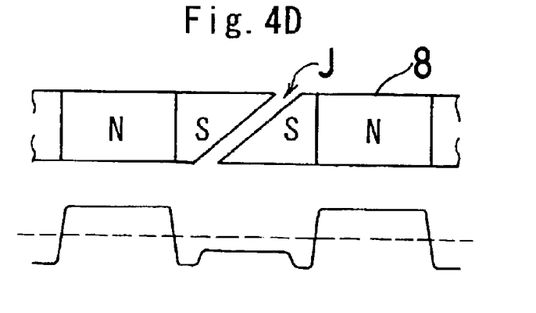

In those shown in FIGS. 4A and 4B, the end portions of the magnetized member (8) are butted to each other so that the magnetic property at the butted portion (J) of the magnetized member (8) becomes the same as the polarity of the other portions, and in those shown in FIGS. 4C and 4D, the end portions of the magnetized member (8) are butted to each other so that the magnetic property at the butted portion (J) of the magnetized member (8) becomes different from the polarity of the other portions. In the former case, although there is a butted portion (J), magnetic polarities are formed so that N-poles and S-poles are arranged alternately with equal pitches on the circumferential surface of the supporting member (7), and in the latter case, a discontinuous portion having a magnetic polarity different from the other portions is formed, and this position can be positively utilized as a reference position, etc. for each rotation.

Here, in comparison with FIGS. 4A and 4B, when there is any error in the manufacturing process, deviations as shown in FIGS. 4C and 4D occur, and since the discontinuous portion is sharp in FIG. 4C and since the discontinuous portion is dull in FIG. 4D, it is preferable to form an arrangement shown in FIG. 4B, when equal pitches in magnetic property are maintained in the vicinity of the butted portion (J) of the magnetized member (8). In other words, in the case when the two ends are cut diagonally, even in the event of any error in the manufacturing process, it is possible to prevent an extreme magnetic property change at the butted portion (J), and consequently to reduce noise caused by the discontinuous portion.

With respect to the shape of the cut ends, not limited to the cut having a straight line shape shown in FIGS. 4A to 4D, various shapes may be adopted. FIGS. 5A to 5D show one example. In FIGS. 5A to 5D also, those on the upper side show shapes in the vicinity of the butted portion (J), and those on the lower side show magnetic properties in the vicinity of the butted portion (J) qualitatively.

Figure 5A:
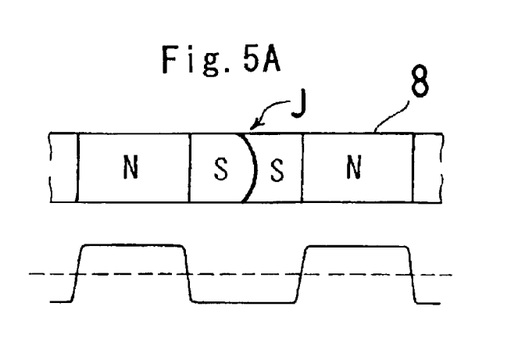
FIGS. 5A to 5D are views showing another modified embodiment of the modified embodiment of the butted portion of the first embodiment of the pulsar ring according to the present invention.

FIG. 5A shows a case where one end of the magnetized member has a convex arc shape with the other end having a concave arc shape. The convex arc shape and the concave arc shape have the same radius, and the two ends of the magnetized member are butted to each other without any gap as shown in FIG. 5A, by adjusting the circumferential length of the affixing face of the magnetized member of the supporting member (7) and the length of the magnetized member (8) so as to be set the same.

Figure 5B:
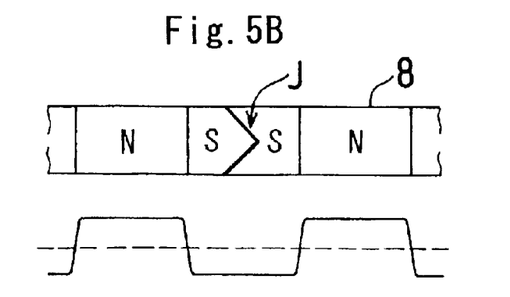

FIG. 5B shows a case where one of the ends of the magnetized member has a convex triangle shape with the other end having a concave triangle shape to be fitted to the former triangle. Then, the two ends of the magnetized member are butted to each other without any gap as shown in FIG. 5A, by adjusting the circumferential length of the affixing face of the magnetized member of the supporting member (7) and the length of the magnetized member (8) so as to be set the same.

Figure 5C:
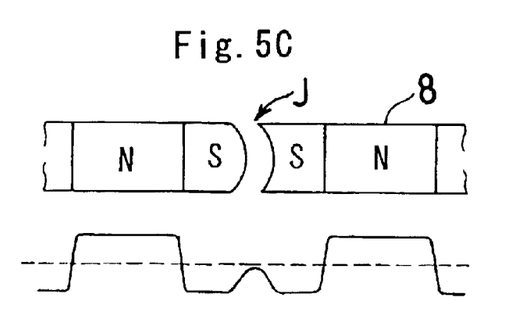
Figure 5D:
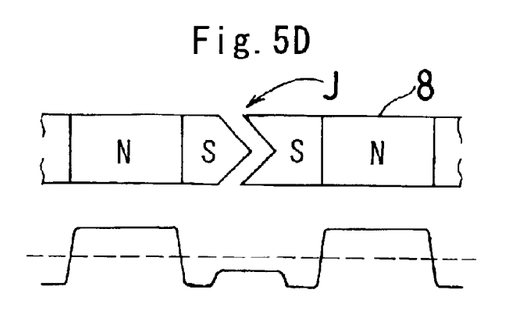

Moreover, FIGS. 5C and 5D show cases where the end portions of the magnetized member (8) are butted to each other so that the magnetic property at the butted portion (J) of the magnetized member (8) is different from the other portions. With this arrangement, a discontinuous portion having a magnetic polarity different from the other portions is formed, and this position can be positively utilized as a reference position, etc. for each rotation.

Furthermore, in FIGS. 5A and 5B, when there is any error in the manufacturing process, deviations as shown in FIGS. 5C and 5D occur; however, in any of the cases in FIGS. 5C and 5D, since the discontinuous portion is dull, even in the event of any error in the manufacturing process, it is possible to prevent an extreme magnetic property change at the butted portion, and consequently to reduce noise caused by the discontinuous portion.

Figure 6:
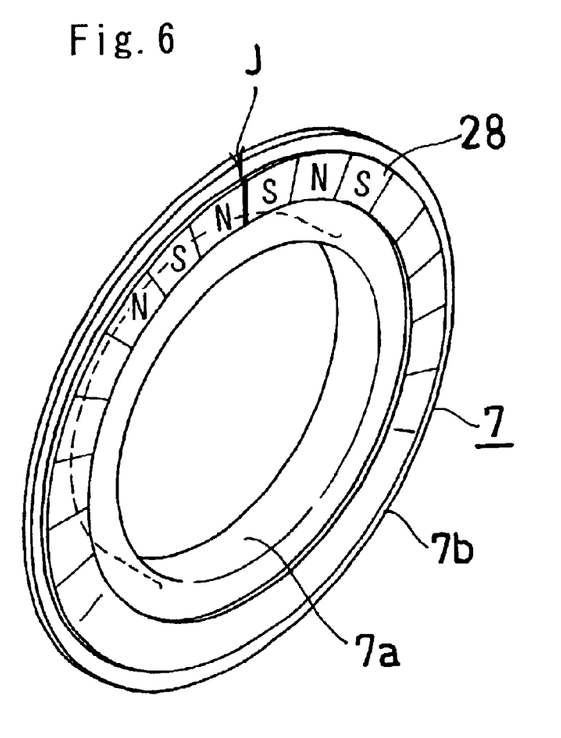
FIG. 6 is a perspective view showing a modified embodiment of the first embodiment of the pulsar ring according to the present invention.

Pulsar rings, shown in FIGS. 3 to 5, are used in the bearing unit shown in FIG. 1, and another modified embodiment of the first embodiment of the pulsar ring in accordance with the present invention may be applied to a bearing unit shown in FIG. 2, and FIG. 6 shows this modified embodiment.

In this pulsar ring, the magnetized member (28) is formed into a continuous ring shape so that the magnetic poles on the surface side are arranged with N-poles and S-poles being alternately placed with equal pitches, and this magnetized member (28) is affixed over the entire outer circumferential face of the supporting member (7) with its end portions being butted to each other. Here, the butted portion (J) of the magnetized member (28) may have the formats respectively correspond to the butted portions (J) of the pulsar ring shown in FIGS. 4 and 5.

Figure 7:
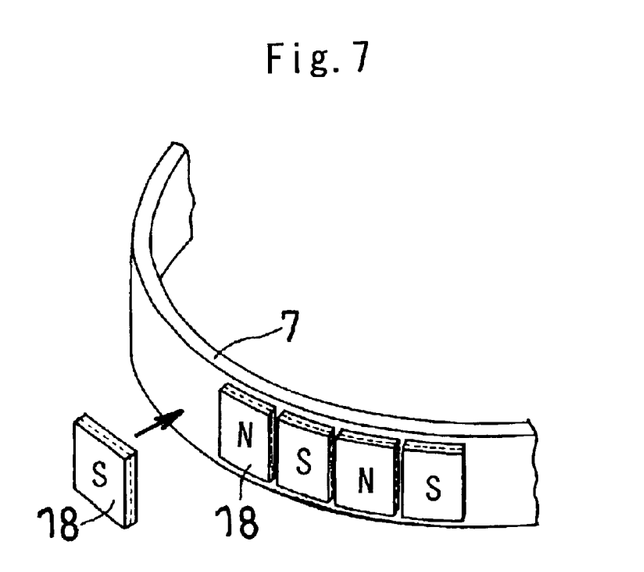
FIG. 7 is a perspective view showing a second embodiment of a pulsar ring according to the present invention.

FIG. 7 shows one example of a second embodiment of a pulsar ring according to the present invention. This pulsar ring is constituted by a ring-shaped supporting member (7) and a plurality of plate-shaped magnets (18) that are secured to the outer circumferential face of the supporting member (7) so that the magnetic poles on the surface side are arranged with N-poles and S-poles being alternately placed with equal pitches.

In accordance with this pulsar ring, the number of magnets (18) is determined based upon the length of the outer circumferential face of the supporting member (7), and the gap in which the magnets (18) are affixed is determined so that these magnets (18) have equal pitches.

Figure 8:
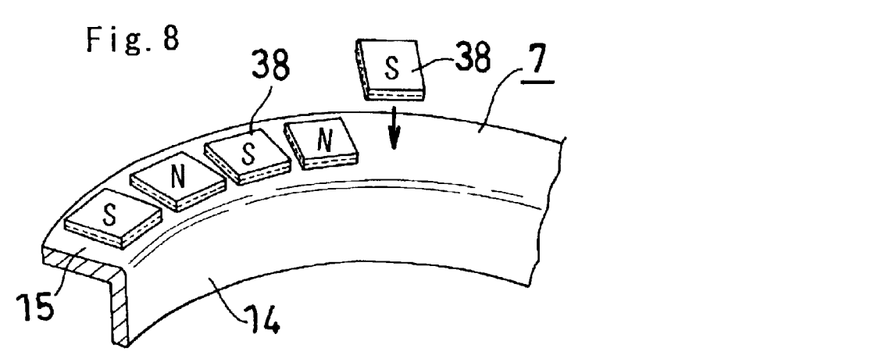
FIG. 8 is a perspective view showing a modified embodiment of the second embodiment of the pulsar ring according to the present invention.
Figure 9:
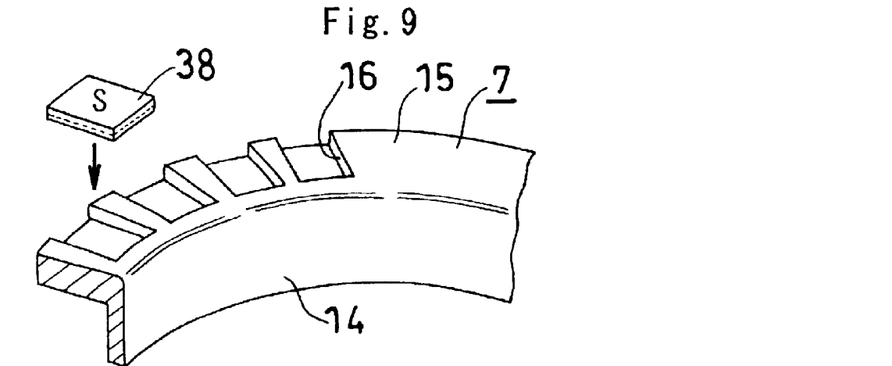
FIG. 9 is a perspective view showing another modified embodiment of the second embodiment of the pulsar ring according to the present invention.

In accordance with the second embodiment of the pulsar ring of the present invention, a plurality of magnets (18) that form the magnetized member may of course be placed on the inner circumferential face or the outer circumferential face of the cylinder unit so as to be applicable to the bearing unit shown in FIG. 1; and an arrangement may be made so that it is also applicable to the bearing unit shown in FIG. 2. FIGS. 8 and 9 show this embodiment.

FIG. 8 shows a modified embodiment of the second embodiment of the pulsar ring of the present invention, and in this pulsar ring, the ring-shaped support member (7) is provided with a cylinder unit (14) and a flange portion (15), and magnets (38) are secured to the outside face of the flange portion (15).

In accordance with this pulsar ring, the number of magnets (38) is determined based upon the length of the side face of the flange portion (15) of the supporting member (7), and the gap in which the magnets (38) are affixed is determined so that these magnets (38) have equal pitches.

FIG. 9 shows another modified embodiment of the second embodiment of the pulsar ring in accordance with the present invention, and in this pulsar ring, the ring-shaped support member (7) is provided with a cylinder unit (14) and a flange portion (15), and concave portions (16) in which the magnets (38) are placed are formed on the outer circumferential face of the flange (15) of the supporting member (7) with equal pitches.

In accordance with this pulsar ring, the magnets (38) are simply affixed to the concave portions (16) formed in the flange portion (15) of the supporting member (7) to obtain the pulsar ring.

Here, in the second embodiment of the above-mentioned pulsar ring of the present invention, by affixing magnets in a manner so as to make only one portion that is not set to equal pitch; thus, this different pitch portion may be used as a reference position for each rotation.

Next, the following description will be given of a magnetizing device and a magnetizing method for the pulsar ring-use magnetized member which is used for manufacturing the pulsar ring of the first embodiment. In the following description of the magnetizing device, "front" refers to "left" in the figures, "rear" refers to "right" in the figures, and "right and left" refer to "lateral direction" when viewed from the front side.

Figure 10:
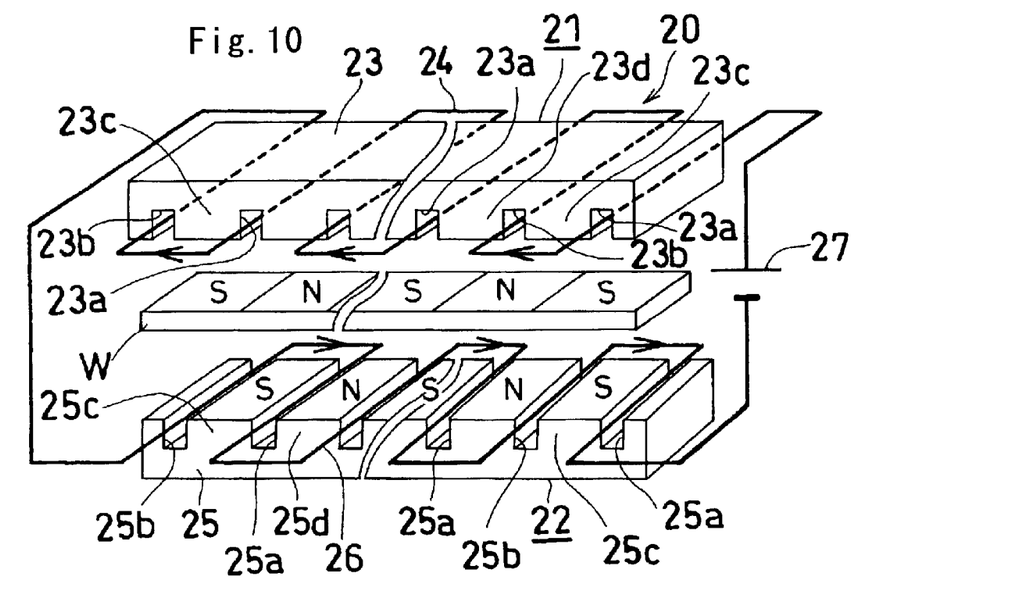
FIG. 10 is a perspective view showing a basic structure of a magnetizing device according to the present invention.
Figure 11:
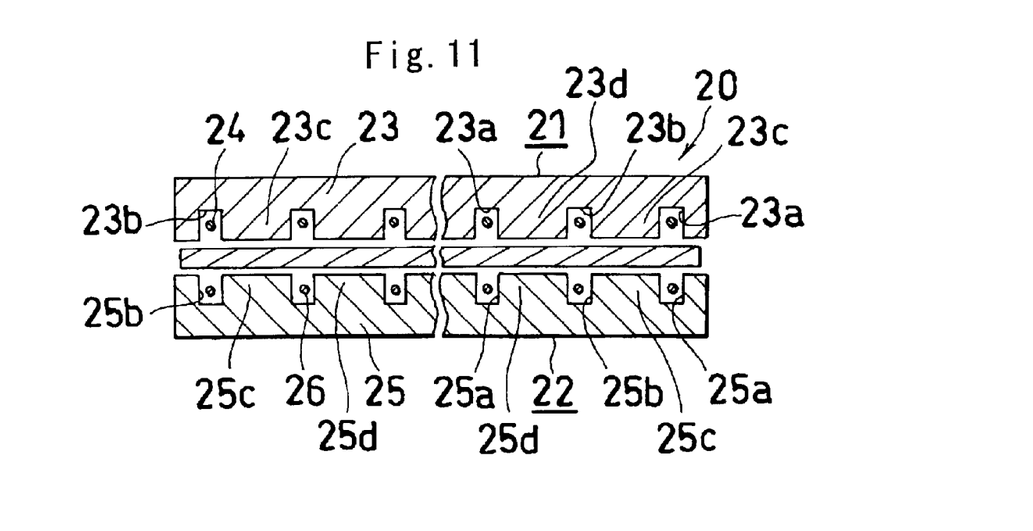
FIG. 11 is a vertical-sectional view of FIG. 10.

FIGS. 10 and 11 show a magnetizing device in accordance with the present invention. As shown in these figures, the magnetizing device (20) is provided with a first magnetizing unit (21) which has a first magnetic pole array in which N-poles and S-poles are alternately arranged and a second magnetizing unit (22) having a second magnetic pole array which faces the first magnetizing unit (21) with a magnetizing magnetic member layout-use gap, and has S-poles and N-poles arranged in a manner opposite to the first magnetic pole array, so that a member to be magnetized (W) is sandwiched by the first magnetizing unit (21) and the second magnetizing unit (22) to be magnetized.

This device is well suited for use in an arrangement in which the member to be magnetized (W) having a strip shape is magnetized with S-poles and N-poles being alternately arranged with equal pitches, and the first and second magnetic pole arrays are linearly formed.

The first magnetizing unit (21) is constituted by a yoke (23) having a rectangular plate shape that extends from the front side to the rear side, and has coil element housing concave portions (23a) and (23b) that are formed in a surface opposing to the member to be magnetized with a gap that equals to the dimension in the length direction of each magnetic pole, and a coil (24) that is formed by allowing a wire to successively pass through the respective concave portions (23a) and (23b) of the yoke (23) in a winding manner.

The second magnetizing unit (22) is constituted by a yoke (25) having a rectangular plate shape that extends from the front side to the rear side, and has coil element housing concave portions (25a) and (25b) that are formed in a surface opposing to the member to be magnetized with a gap that equals to the dimension in the length direction of each magnetic pole, and a coil (26) that is formed by allowing a wire to successively pass through the respective concave portions (25a) and (25b) of the yoke (25) in a winding manner.

The coil (24) of the first magnetizing unit (21) is formed by allowing a wire, which has a leading end at the plus side of an ac power supply (27) formed on the rear side of the magnetizing unit (21), to pass from right to left through the first (odd numbered) concave portion (23a) from the rear side, and then to pass from left to right through the second (even numbered) concave portion (23b) from the rear side, and this arrangement is repeated in the same manner in the odd-numbered concave portion (23a) from the rear side and the even-numbered concave portion (23b) from the rear side so that the arrangement is formed in a winding manner as a whole.

In the same manner, the coil (26) of the second magnetizing unit (22) is formed by allowing a wire, which has a leading end at the minus side of the ac power supply (27) formed on the rear side of the magnetizing unit (22), to pass from left to right through the first (odd numbered) concave portion (25b) from the front side, and then to pass from right to left through the second (even numbered) concave portion (25a) from the front side, and this arrangement is repeated in the same manner in the odd-numbered concave portion (25b) from the front side and the even-numbered concave portion (25a) from the front side so that the arrangement is formed in a winding manner as a whole.

The power supply (27) may be installed separately for each of the coil (24) of the first magnetizing unit (21) and the coil (26) of the second magnetizing unit (22); however, in the present embodiment, by connecting the leading ends of the coils (24) and (26) of the respective magnetizing units (21) and (22) at the left edge portions so that the two coils (24) and (26) are formed by a single wire so that power is supplied to both of the coils (24) and (26) by the commonly used power supply (27).

Here, the concave portions (23a), (23b), (25a) and (25b) of the respective yokes (23) and (25) are used for housing intermediate portions of the coil elements that extend from left to right among the coils (24) and (26) that have been wound in a winding manner, and in place of the concave portions (23a), (23b), (25a) and (25b), through holes in the width direction that extend in the left-to-right direction in the vicinity of the opposing face of the member to be magnetized of the respective yokes (23) and (25) may be form When the dc power supply (27) is turned on, in the coil (24) of the first magnetizing unit (21), a current is allowed to flow from right to left through the first (and the succeeding odd numbered) concave portions (23a) from the rear side and also to flow from left to right through the second (and the succeeding even numbered) concave portions (23b) from the rear side; thus, a magnetic field having the N-pole on the upper side and the S-pole on the lower side is formed in the first (and the succeeding odd numbered) convex portions (23c) from the rear side and a magnetic field having the S-pole on the upper side and the N-pole on the lower side is formed in the second (and the succeeding even numbered) convex portions (23d) from the rear side. Moreover, in the coil (26) of the second magnetizing unit (22), a current is allowed to flow from left to right through the first (and the succeeding odd numbered) concave portions (25b) from the front side and also to flow from right to left through the second (and the succeeding even numbered) concave portions (25a) from the front side; thus, a magnetic field having the N-pole on the upper side and the S-pole on the lower side is formed in the first (and the succeeding odd numbered) convex portions (25c) from the front side and a magnetic field having the S-pole on the upper side and the N-pole on the lower side is formed in the second (and the succeeding even numbered) convex portions (25d) from the front side. Therefore, with respect to a pair of convex portions (23c), (25c), (23d) and (25d) that face vertically, the direction of the magnetic force of the first magnetizing unit (21) and the direction of the magnetic force of the second magnetizing unit (22) are set to the same direction so that the magnetic force is strengthened with the adjacent convex portions (23c), (25c), (23d) and (25d) having mutually opposite magnetic polarities; thus, the member to be magnetized (W) is magnetized by this magnetic force.

Here, a gap may be placed between the respective magnetizing units (21) and (22) and the member to be magnetized (W), or the respective magnetizing units (21) and (22) and the member to be magnetized (W) may be made in contact with each other. In the case of the contact state, the magnetic force of the member to be magnetized (W) can be further strengthened, and even in this case, since the member to be magnetized (W) is not moved with respect to the magnetizing units (21) and (22), it is possible to prevent the member to be magnetized (W) from being scratched.

In the above-mentioned arrangement, each of the yokes (23) and (25) has a rectangular plate shape that extends from the front side to the rear side, and as shown in FIGS. 3A and 3B, the magnetized member (8) obtained by the magnetizing device (20) has a strip shape so that by affixing this to the outer circumferential face of the supporting member (7), it is possible to obtain a pulsar ring (3) shown in FIG. 1. Then, each of the yokes (23) and (25) is formed into the same disc shape with a hole so that a ring-shaped magnetized member (28) is obtained; thus, it is possible to obtain a magnetizing member (28) that is well suited for use in affixing onto the side face of the flange portion (7b) shown in FIGS. 2 and 6.

In the magnetizing method in accordance with the present invention, the above-mentioned magnetizing device is used and the member to be magnetized is sandwiched by the first and second magnetizing units from both of the sides so that the member to be magnetized is magnetized over the entire length thereof; thus, it is possible to carry out a multipolar magnetizing process on the strip-shaped magnetized member. Since, upon magnetizing, it is not necessary to move the member to be magnetized, it is possible to prevent the member to be magnetized from being scratched even when the yoke of the magnetizing unit and the member to be magnetized come in contact with each other.

Next, the following description will be given of a preferred embodiment of a bearing unit in which the pulsar ring in accordance with the first embodiment of the present invention is used, and the pulsar ring, which has N-poles and S-poles arranged alternately and outputs a rotation signal, and a sensor device, which has a magnetic sensor placed so as to face the pulsar ring and a signal processing unit for carrying out a signal processing based upon the output from the magnetic sensor, are allowed to rotate relatively.

Figure 12A:
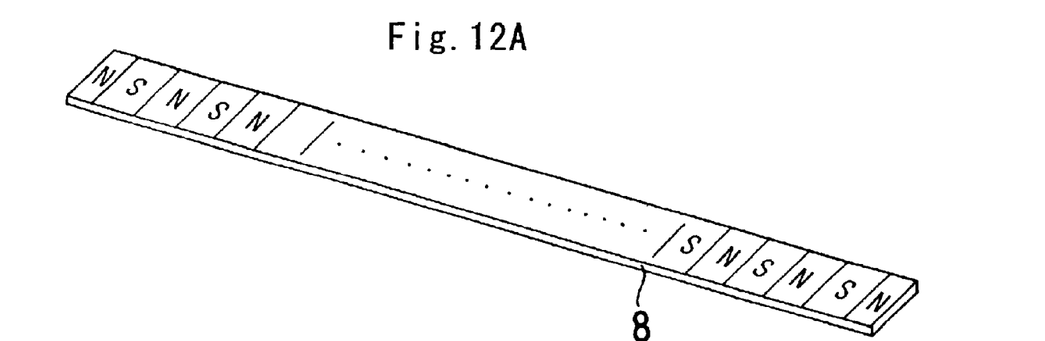
FIGS. 12A and 12B is a perspective view showing one example of a pulsar ring used in a bearing unit according to the present invention.
Figure 12B:
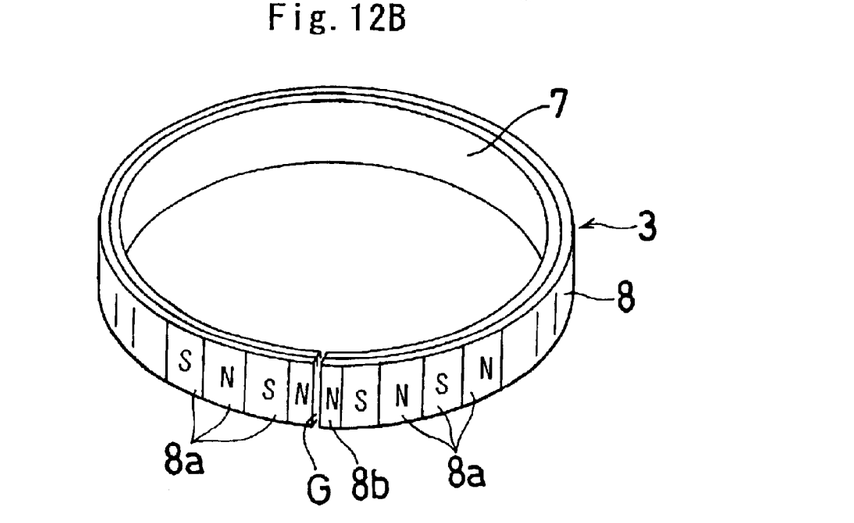

As shown in FIGS. 12A and 12B, in the pulsar ring (3), the magnetized member (8) is formed to have a strip shape so that magnetic poles on the surface side are arranged with N-poles and S-poles being alternately placed with equal pitches, and this magnetizing member (8) is affixed over the entire outer circumferential face of the supporting member (7) with its end portions facing each other. Here, each of the two ends portions of the magnetized member (8) is provided as an N-pole that has approximately one-half of the width of the other N-pole so that at the butted portion of the magnetized member (8), these N-poles having approximately one-half of the width are aligned face to face with each other with a gap (G) therebetween.

Moreover, for example, two strip-shaped magnetized member s having one-half of the circumferential length may be affixed over the entire outer circumferential face of the supporting member (7) with the respective end portions being aligned face to face with each other, and the reference position maybe detected for each one-half of the circumference.

Figure 14:
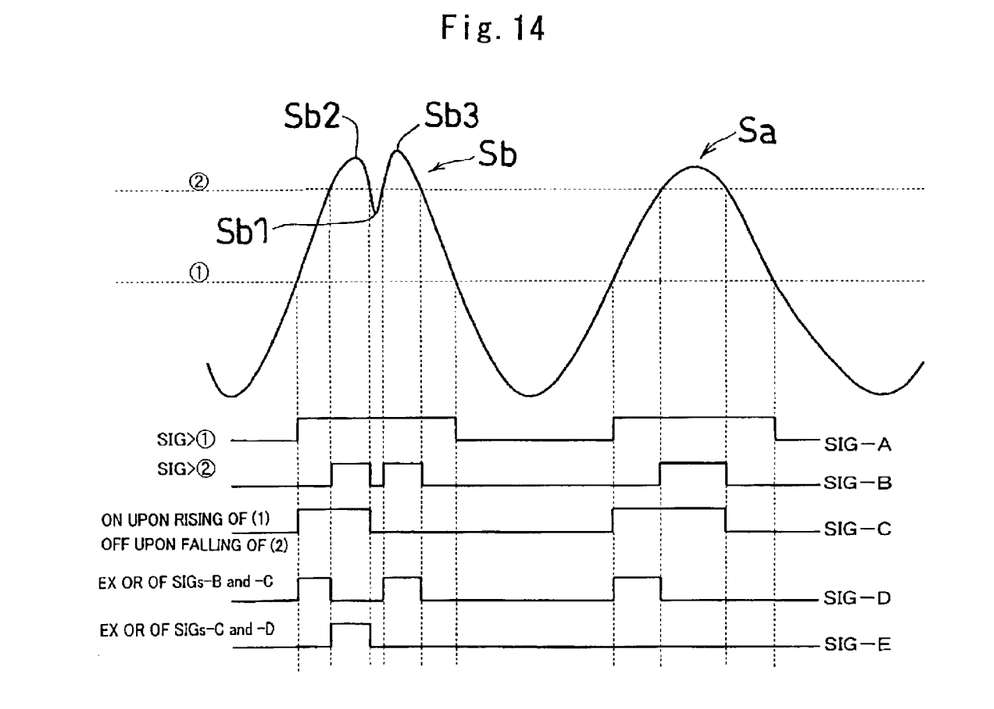
FIG. 14 is a graph showing respective signals obtained in middle and final stages in the signal processing unit of the bearing unit according to the present invention.

This gap (G) is used for forming a detection-subject portion (8b) for a reference position signal that has a magnetic force weaker than that of the other portions (8a) on one portion of the circumference of the pulsar ring (3), and as a result, with respect to the output from the pulsar ring (3), as shown in FIG. 14, a reference signal peak portion (Sa), which constitutes a sine curve by output signals from the portions (8a) other than the butted portion, and a peak portion (Sb) for a reference position signal in which peak portions are formed in a reversed W-letter shape with a small bottom value (Sb1) being located between the two peak values (Sb2) and (Sb3) are formed.

FIG. 12B shows a butted portion (J) that has been shown in FIG. 4B; however, the butted portion (J) forming a gap (G) may be provided as those shown in FIG. 4D, FIG. 5C and FIG. 5D.

Figure 13:
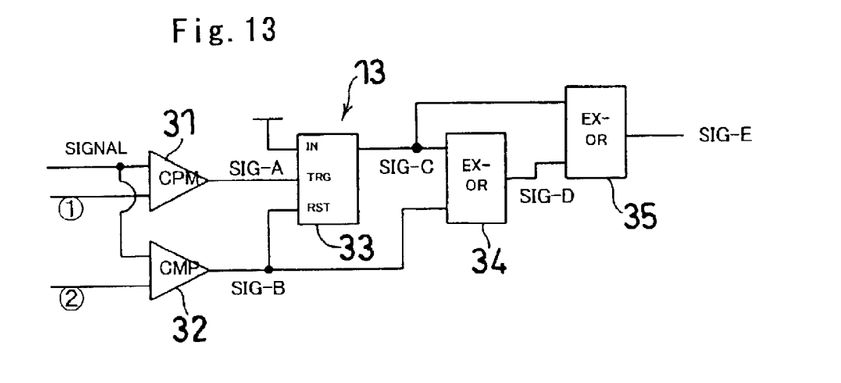
FIG. 13 is a circuit diagram showing one example of a signal processing unit of the bearing unit according to the present invention.

FIG. 13 shows a signal processing unit for a sensor device which finds a rotation signal and a reference position signal, and FIG. 14 shows a signal obtained by this signal processing unit.

In FIG. 13, the signal processing unit (13) of the sensor device is provided with a first comparator (31) which has a first threshold value <1> that is smaller than a small bottom value (Sb1) of the reference position signal-use peak portion (Sb) of the output signal from the detection-subject portion for a reference position signal detection (8b), and outputs an ON signal as an A signal (SIG-A) when the input signal is not less than this threshold value <1>, a second comparator (32) which has a second threshold value <2> which is greater than the small bottom value (Sb1) of the reference position signal-use peak portion (Sb) of the output signal from the detection-subject portion for a reference position signal detection (8b), and is also smaller than an output peak (Sb2) and (Sb3) of the reference position signal-use peak portion (Sb), and outputs an ON signal as a B signal (SIG-B) when the input signal is not less than this threshold value <2>, a flip-flop (33) which outputs an ON signal when the input signal exceeds the first threshold value <1>, and also outputs an OFF signal as a C signal (SIG-C) when it goes below the second threshold value <2>, a first exclusive logical OR circuit (34) which outputs an exclusive OR signal of the B signal (SIG-B) and C signal (SIG-C) as a D signal (SIG-D), and a second exclusive logical OR circuit (35) which outputs an exclusive OR signal of the C signal (SIG-C) and D signal (SIG-D) as an E signal (SIG-E).

As shown in FIG. 13, the A signal (SIG-A), outputted from the first comparator (31), forms an ON signal in the same manner as a signal from a portion (8a) other than the butted portion, also in the reference position signal-use peak portion (Sb) of the output signal from the detection-subject portion for a reference position signal detection (8b). Consequently, the A signal (SIG-A) can be used as a rotation signal. The B-signal (SIG-B), outputted from the second comparator (32), forms an ON signal each time in response to one peak (Sa) with respect to the output signal from a portion (8a) other than the butted portion; however, it forms an ON-OFF-ON signal with respect to the output signal from the detection-subject portion for a reference position signal detection (8b). The C signal (SIG-C), outputted from the flip-flop (33), forms an ON signal when the A signal (SIG-A) is on, and then becomes an OFF signal when the B signal (SIG-B) has been turned off. Thus, the C signal (SIG-C), outputted from the flip-flop (33), forms an ON signal upon receipt of a rise of the first threshold <1>, and also forms an OFF signal upon receipt of a fall of the second threshold <2>. The D signal (SIG-D), outputted from the first exclusive OR circuit (34), is maintained in the ON state during a period from the first threshold <1> to the second threshold <2> and, when there is a small bottom value (Sb1) in the peak portion (Sb), is also maintained in the ON state from the time at which it has reached the second threshold value <2> after passing through the small bottom value (Sb1) until the time at which it goes below the second threshold value <2>. The E signal (SIG-E), outputted from the second exclusive OR circuit (35), is turned on only upon receipt of the output signal from the detection-subject portion for a reference position signal detection (8b); thus, the E signal (SIG-E) becomes applicable as an origin output signal.

Therefore, when the pulsar ring (3) is allowed to rotate relative to the sensor device (2), the flux density, generated by the magnetic force of the magnetized member (8) of the pulsar ring (3), is changed, and this change is detected by the sensor device (2). Among respective signals outputted at this time, the A signal (SIG-A) is used for detecting a rotation speed, and the E signal (SIG-E) is used for detecting the reference position signal. Thus, it is possible to provide a bearing unit with a sensor which can detect a reference position signal although it has the same number of parts as those that find only the number of rotation.

Here, the reference position signal can also be obtained by using a logical product between NOR of the C signal (SIG-C) and the D signal (SIG-D), and it is of course possible to replace the respective circuits (31), (32), (33), (34) and (35) of the above-mentioned signal processing unit (13) with one or a plurality of circuits that have the same functions.

Moreover, in the above description, description have been given of cases in which end portions are set to N-poles and a voltage from the N-pole is set as a positive voltage; however, of course, the end portions may be set to S-poles with a voltage from the S-pole being set as a negative voltage. In this case, the respective terms such as the small bottom value, output peak and threshold values are replaced with the terms such as the absolute value of a small peak value, the absolute value of an output bottom and the absolute value of a threshold value.

Furthermore, FIGS. 1 and 2 only show embodiments in which the pulsar ring (3) is secured to the inner ring (5); however, the pulsar ring (3) may be secured to the outer ring (4). In this case, the small-diameter cylinder unit of the supporting member may be fitted to the outer ring with the magnetized member being secured to the inner circumferential face of the large-diameter cylinder unit, or the large-diameter cylinder unit of the supporting member may be fitted to the outer ring with the magnetized member being secured to the inner circumferential face of the small-diameter cylinder unit.

What is claimed is:

1. A pulsar ring comprising:
    a magnetized member and a ring-shaped supporting member, wherein
    the magnetized member has a strip shape and is magnetized so that N-poles and S-poles are alternately arranged thereon prior to being secured to the supporting member.

2. The pulsar ring according to claim 1, wherein
    the circumferential face of the supporting member has a length corresponding to the length of the magnetized member so that ends of the magnetized member are butted to each other without any gap with the magnetic property in the vicinity of the butted portion being allowed to have equal pitches.

3. The pulsar ring according to claim 1, wherein
    the circumferential face of the supporting member has a length corresponding to the length of the magnetized member so that ends of the magnetized member are butted to each other without any gap, and the magnetic property in the vicinity of the butted portion of the magnetized member is set to unequal pitches.

4. The pulsar ring according to claim 1, wherein an end face of the magnetized member is formed as a face other than the face orthogonal to the length direction.

5. The pulsar ring according to claim 1, wherein
    the magnetized member is constituted by a rubber magnetic material.

6. A bearing unit comprising:
    a pulsar ring having N-poles and S-poles alternately arranged so as to output a rotation signal; and
    a sensor device having a magnetic sensor placed to face the pulsar ring and signal processing means for carrying out signal processing based upon an output from the magnetic sensor, said pulsar ring and said sensor device being rotated relatively, wherein
    the pulsar ring is constituted by a ring-shaped supporting member and at least one continuous magnetized member affixed to this along the circumferential direction thereof, with the end portion magnetic poles of the magnetized member that face each other having the same pole, with a gap being formed at the butted portion of the magnetized member, so that a detected part for a reference position signal, which provides an output signal having a small bottom value at a peak portion, is formed at one place on the circumference of the pulsar ring, and the signal processing means of a sensor device is provided with a reference position signal detection unit for detecting the detected part for a reference position signal of the pulsar ring.

7. The bearing unit according to claim 6, wherein the signal processing means has a first threshold value which is smaller than the small bottom value of the output signal from the detected part for a reference position signal detection and a second threshold value which is greater than the small bottom value of the output signal from the detected part for a reference position signal detection and also smaller than the output peak of the detected part for a reference position signal detection, and when the input signal exceeds the first threshold value, the rotation signal is outputted while, when the input value, after having become smaller than the second threshold value, again exceeds the second threshold value before reaching the first threshold value, the reference position signal is outputted.

* * * * *